United States Patent [19]
Jones et al.

[11] 3,954,638
[45] May 4, 1976

[54] STORAGE-STABLE GREASE COMPOSITIONS

[75] Inventors: John A. Jones; Alexander C. B. MacPhail; Charles B. Milne, all of Wirral; Kenneth M. Riches, Sandiway, all of England

[73] Assignee: Shell Oil Company, Houston, Tex.

[22] Filed: Mar. 24, 1975

[21] Appl. No.: 561,572

[30] Foreign Application Priority Data
Mar. 26, 1974 United Kingdom............... 13282/74

[52] U.S. Cl................................. 252/40; 252/42.1; 252/47; 252/402
[51] Int. Cl.²...................... C10M 1/24; C10M 3/18; C10M 1/54; C10M 3/48
[58] Field of Search............... 252/40, 42.1, 47, 402

[56] References Cited
UNITED STATES PATENTS

| | | | |
|---|---|---|---|
| 2,959,548 | 11/1960 | O'Halloran et al. | 252/40 |
| 3,523,910 | 8/1970 | Randell | 252/47 |
| 3,801,506 | 4/1974 | Cross et al. | 252/40 |

*Primary Examiner*—Delbert E. Gantz
*Assistant Examiner*—I. Vaughn

[57] ABSTRACT

Grease compositions comprising a mineral lubricating oil thickened to grease consistency having incorporated therein minor amounts of a crude solid N—$C_{7-8}$ hydrocarbyl substituted phenothiazine inhibitor have improved storage stability concomitant with desirable high temperature lubricating properties.

9 Claims, No Drawings

STORAGE-STABLE GREASE COMPOSITIONS

BACKGROUND OF THE INVENTION

Greases possessing good high speed lubricating characteristics are required in a variety of industrial applications, particularly in the lubrication of bearings, such as, for example, electric motor bearings. Products of this type must be capable of lubricating wearing surfaces for extended periods of time at temperatures of as high as 150°C and above, and must, therefore, possess good high temperature bearing life and oxidation stability properties.

In this latter respect, a class of very effective oxidation inhibitors are those of the phenothiazine type, e.g., phenothiazine and various phenothiazine derivatives such as N-substituted and dialkyl substituted phenothiazines, which compounds are normally added as minute crystals. Although these compounds are known to be highly efficacious antioxidants in synthetic lubricants — see, for example, U.S. Pat. No. 3,803,140 —, they have found only limited application in mineral lubricating oil based greases because of their tendency to form large macroscopic crystals in these products which renders the greases unsuitable for many lubricating applications. These crystals generally form in the finished grease during storage or after use at a high temperature; see, for example, U.S. Pat. No. 3,663,438. In order to prevent phenothiazine-type inhibitor recrystallization, it has been disclosed previously that relatively large amounts of other additives such as polyesters known as recrystallization retarders should also be incorporated in mineral lubricating oil based greases.

SUMMARY OF THE INVENTION

It has now been found that grease compositions comprising a mineral lubricant base thickened to grease consistency and having incorporated minor amounts of a crude solid $N-C_{7-8}$ hydrocarbyl substituted phenothiazine inhibitor, prepared in a specific way and without further addition of any recrystallization retarder additive, not only afford unexpectedly a means of overcoming the inhibitor recrystallization problem of the prior art, but additionally possess bearing lives of similar longevity to mineral lubricating oil based greases to which have been added pure crystalline N-hydrocarbyl phenothiazine inhibitors.

Accordingly, the invention provides a grease composition comprising a major amount of a mineral lubricating oil thickened to a grease consistency having incorporated therein from about 0.5 to about 3% by weight of a crude solid $N-C_{7-8}$ hydrocarbyl substituted phenothiazine inhibitor produced by (1) reacting phenothiazine in an inert petroleum hydrocarbon solvent with a molar excess of up to 25% of finely-divided alkali metal hydroxide at a temperature of from about 110° to about 210°C with removal of the water formed in the reaction, (2) reacting the resultant alkali metal salt of phenothiazine with a molar excess of up to 10% of hydrocarbyl halide of 7-8 carbon atoms, (3) treating the resultant mixture with a solid selective adsorbent followed by simultaneous removal of said adsorbent and the alkali metal halide formed, and (4) removing said inert solvent and recovering a solid product without further purification.

DESCRIPTION OF THE PREFERRED EMBODIMENTS

In the preparation of the crude solid $N-C_{7-8}$ hydrocarbyl substituted phenothiazine inhibitor used in the invention, the finely-divided alkali metal hydroxide, which is reacted with phenothiazine in an inert petroleum hydrocarbon solvent, can be obtained by finely dividing solid alkali metal hydroxide by conventional comminution techniques, such as by grinding or milling in said inert solvent, for example, to a particle size of at least part of the particles below 10 $\mu$. It is preferred to add the alkali metal hydroxide to the phenothiazine in a non-aqueous solution although it is possible to add the alkali metal hydroxide in an aqueous solution with subsequent removal of the water, for example, by distillation. If desired, an emulsifier may also be present. The alkali metal hydroxide suitably employed can be sodium hydroxide, lithium hydroxide or potassium hydroxide; potassium hydroxide is particularly preferred.

The inert solvent suitably employed is a petroleum hydrocarbon solvent, in particular petroleum fractions with an initial boiling point from 150°-200°C, such as a white oil or a kerosene. Mixtures thereof may also be used.

The amount of alkali metal hydroxide employed is in small molar excess, up to 25%, over the phenothiazine. The reaction between the phenothiazine and the alkali metal hydroxide is suitably carried out at moderately elevated temperatures in the range of from about 110° to about 210°C, preferably from about 150° to about 170°C, with removal of the water formed in the reaction. This water may be removed by distillation, such as azeotropic distillation, or with the aid of a desiccant, such as calcined calcium oxide.

After the alkali metal salt of phenothiazine has been formed, which in general takes from about 1 to about 5 hours, the hydrocarbyl halide reactant is added, if desired after cooling; it is also possible to have the hydrocarbyl halide present during the reaction of the alkali metal hydroxide with phenothiazine. The hydrocarbyl halide is suitably employed in small molar excess, up to 10%, over phenothiazine.

The hydrocarbyl halide reacts with the alkali metal salt of phenothiazine in an exothermic reaction with formation of N-hydrocarbyl substituted phenothiazine and alkali metal halide. At this point it is preferable to treat the resultant mixture with a conventional solid selective adsorbent such as activated carbon and the like. The alkali metal halide may be removed prior to treatment with the solid selective adsorbent by conventional means such as by washing with water. Preferably, the alkali metal halide is removed after said treatment and simultaneously with the removal of said adsorbent, e.g., by filtration. Finally, the inert petroleum hydrocarbon solvent used in the processing is removed substantially or totally, by convenient means, e.g., by distillation, and the desired solid product without further purification is recovered for use in the grease compositions of the invention.

The hydrocarbyl halide to be used may be an iodide, bromide, or chloride, preferably a bromide or chloride. The hydrocarbyl group may, e.g., be an alkyl group, a cycloalkyl group, an alkenyl group, an aryl group, or an alkaryl group. Representative examples of useful hydrocarbyl halides include octyl chloride, dodecyl chloride or -bromide, and benzyl chlorides which contain one or more alkyl substituents in the aromatic ring.

Particularly preferred is a hydrocarbyl halide of seven to eight carbon atoms such as benzyl chloride or octyl bromide.

The oleaginous lubricant base into which the specific phenothiazine-type inhibitors produced as described hereinabove are ultimately incorporated in producing the grease compositions of the invention are hydrocarbon lubricating oils, preferably mineral lubricating oils which include those derived from refined, unrefined, semirefined naphthenic, paraffinic, or asphaltic base mineral oil having a viscosity in the range of from about 50 to about 3,500 seconds Redwood I at 140°F. Suitable base stocks also include blends of the above mineral lubricating oils.

The oleaginous lubricant base can be thickened with a wide variety of thickeners such as organic thickeners, clay thickeners, or soap-base thickening agents. Suitable organic thickeners include dibenzimidazole compounds, di-urea-urethane polymers and the like. Suitable clay thickeners should have a substantial base exchange capacity, normally at least 25 milliequivalents per 100 grams. Bentonites, in particular magnesium bentonites, sometimes referred to as hectorites, are preferred. These clays are normally made oleophilic by absorption of, or reaction with, organic ammonia bases or their salts.

Suitable soap-based thickeners include any metal soap of a fatty acid which is capable of providing a stable gel structure to mineral lubricating oil base fluids. The term soap-base is intended to cover conventional metal soaps, complex soaps and mixed base soaps. Especially advantageous soap-base thickeners are alkali metal and/or alkaline earth metal soaps or soap/salt complexes of one or more fatty acids. The metal radical of the soap employed can be sodium, potassium, calcium, barium, strontium or aluminum and, in particular, lithium and/or calcium. More than one metal radical may be used. Where saponification is carried out in situ this is usually effected by the hydroxide of the metal concerned, but other suitable saponifying agents are the corresponding oxides. Similarly, the fatty acid portion of the soap can be any fatty acid or a mixture of fatty acids or a mixture of fatty acids and other acids, e.g., acetic acid, benzoic acid, known to be capable of forming a soap/salt complex suitable for grease manufacture. Such fatty acids are those occurring as esters in animal oils and fats, vegetable oils, fats and waxes and fish oils, and also synthetically prepared long-chain fatty acids. Such fatty acids can be saturated, e.g., myristic, palmitic and stearic acids, or unsaturated, e.g., oleic acid, or they can be substituted fatty acids; 12-hydroxystearic acid is especially suitable. Soaps derived from commercial mixtures of fatty acids or fatty acid glycerides may be employed.

The particular solid $N-C_{7-8}$ hydrocarbyl substituted phenothiazine inhibitors produced as described hereinabove can be incorporated in the grease compositions of the invention in concentrations of about 0.5 to about 3% by total composition weight.

In addition to the particular phenothiazine-type inhibitor of the invention, other additives can also be incorporated into the inventive grease compositions, for example, anti-corrosion agents such as sodium nitrite, sodium sebacate, amino- or benzo-triazoles, glycerol monooleate, etc; additional antioxidants such as quinolines, polymerized dihydroquinolines which may be alkyl-substituted, tert-octylphenyl-alpha-naphthylamine, metal dithiocarbamates, dilauryl selenide, etc; viscosity index improvers such as methacrylate polymers and copolymers; extreme pressure agents, antiwear agents, and any other additive recognized in the art to perform a particular function or functions.

The grease compositions of the invention can be prepared by methods well known to the art and their effectiveness generally is not dependent on the particular order of adding the various constituents. Normally, the thickening agent is incorporated into the mineral oil lubricant base first. Then the phenothiazine-type inhibitor and any of the additives mentioned in the preceding paragraph, either separately or as a mixture, are incorporated advantageously in the final cooling stage of the grease preparation after the grease structure has been substantially formed.

EXAMPLE I 0.5 Mole of phenothiazine was dissolved in 500 ml of white oil. 2.8 g of oleic acid and 1.5 g of triethanolamine in a small amount of white oil were added as emulsifier. The mixture was heated and stirred vigorously while a solution of 0.6 mole of KOH in 20 ml of water was added dropwise. The temperature was raised to reflux, and with stirring 34.5 ml of water were removed by azeotropic distillation over 3 hours. The mixture was cooled and 0.55 mole of benzyl chloride was added dropwise over 0.5 hour with vigorous stirring. The mixture was refluxed for 0.5 hour, treated with activated carbon and filtered. The solvent was removed by distillation to yield a viscous oil which solidified on standing. The solid product recovered without further purification contained 91% pure N-benzylphenothiazine and small amounts of impurities such as phenothiazine.

The crude solid N-benzyl substituted phenothiazine inhibitor prepared hereinabove was incorporated in a lithium 12-hydroxystearate based grease and in a lithium/calcium 12-hydroxystearate based grease (in 1%w concentration), together with 2%w sodium nitrite and 1%w tert-octylphenyl-alphanaphthylamine. The oil base of the grease was a mineral lubricating oil with a viscosity of 160 seconds Redwood I at 140°F. The grease compositions so obtained were tested in the IP 168/72 rig test at 5000 rev./min. at 150°C in a non-run-in 40-mm ball bearing. They showed a bearing life of over 1,000 hours, which is bearing life of similar longevity to mineral lubricating oil greases containing comparable amounts of pure crystalline N-benzylphenothiazine inhibitor.

The above grease compositions of the invention did not show any crystals after three months storage.

EXAMPLE II

A suspension of 0.6 moles KOH in 100 ml kerosine (boiling range 150°–300°C) was prepared by high speed mixing in a Silverson mixer. This suspension was diluted to 400 ml with kerosine containing 0.5 moles of phenothiazine. The mixture was heated to reflux temperature under vigorous stirring. Water formed was removed by azeotropic distillation; it took three hours to remove 0.5 moles of water. The orange/yellow mixture of the potassium salt of phenothiazine obtained was cooled to room temperature, and 0.55 moles of benzyl chloride was added dropwise over 0.5 hour with vigorous stirring. The mixture was subsequently refluxed for 0.5 hour, treated with activated carbon, filtered and the solvent removed to yield a viscous oil which solidified on standing. This solid product, which contained 85% pure N-benzylphenothiazine and small amounts of impurities such as phenothiazine, was incorporated in a lithium 12-hydroxystearate-based grease and in a lithium/calcium 12-hydroxystearate-based grease (in 1%w concentration), together with 2%w sodium nitrite and 1%w tert-octylphenyl-alpha-naphthylamine. The oil base of the grease was a mineral lubricating oil with a viscosity of 160 seconds Redwood 1 at 140°F. The grease compositions so obtained were tested in the IP 168/72 rig test as described in Example 1, and showed a bearing life of over 1,000 hours, which is bearing life of similar longevity to mineral lubricating oil greases containing comparable amounts of pure crystalline N-benzylphenothiazine inhibitor.

No crystal formation was detected in the above grease compositions of the invention after three months storage.

What is claimed is:

1. A grease composition comprising a major amount of a mineral lubricating oil thickened to a grease consistency having incorporated therein from about 0.5 to about 3% by weight of a crude solid N—$C_{7-8}$ hydrocarbyl substituted phenothiazine inhibitor produced by (1) reacting phenothiazine in an inert petroleum hydrocarbon solvent with a molar excess of up to 25% of finely-divided alkali metal hydroxide at a temperature of from about 110° to about 210°C with removal of the water formed in the reaction, (2) reacting the resultant alkali metal salt of phenothiazine with a molar excess of up to 10% of hydrocarbyl halide of 7–8 carbon atoms, (3) treating the resultant mixture with a solid selective adsorbent followed by simultaneous removal of said adsorbent and the alkali metal halide formed, and (4) removing said inert solvent and recovering a solid product without further purification.

2. The composition of claim 1 wherein said alkali metal hydroxide is potassium hydroxide.

3. The composition of claim 1 wherein said hydrocarbyl halide is benzyl chloride.

4. The composition of claim 1 wherein said hydrocarbyl halide is octyl bromide.

5. The composition of claim 1 wherein the temperature of (1) is from about 150° to about 170°C.

6. The composition of claim 1 wherein the lubricating oil is thickened to grease consistency by use of a lithium soap.

7. The composition of claim 1 wherein the lubricating oil is thickened to grease consistency by use of a lithium/calcium mixed base soap.

8. The composition of claim 6 wherein the soap is lithium 12-hydroxystearate soap.

9. The composition of claim 7 wherein the soap is lithium/calcium 12-hydroxystearate soap.

* * * * *